United States Patent [19]

Seita et al.

[11] Patent Number: 5,279,738
[45] Date of Patent: Jan. 18, 1994

[54] PERMEABLE MEMBRANE EXCELLENT IN BIOCOMPATIBILITY

[75] Inventors: Yukio Seita; Hideaki Kito; Katsuhiro Takanashi; Mitsuhide Nakagawa, all of Ashigarakami, Japan

[73] Assignee: Terumo Kabushiki Kaisha, Tokyo, Japan

[21] Appl. No.: 881,636

[22] Filed: May 12, 1992

Related U.S. Application Data

[63] Continuation of Ser. No. 721,682. Pat. No. 5,137,635

[30] Foreign Application Priority Data

Jun. 26, 1990 [JP] Japan .................. 2-169248
Jun. 26, 1990 [JP] Japan .................. 2-169249

[51] Int. Cl.$^5$ ............................................ B01D 71/56
[52] U.S. Cl. ................... 210/500.38; 210/500.28; 210/500.27
[58] Field of Search ......... 210/500.38, 500.28, 210/500.27, 490; 264/41, 49; 427/245, 246

[56] References Cited

U.S. PATENT DOCUMENTS 4,235,714 11/1980 Thompson et al. .............. 210/654
4,963,165 10/1990 Blume et al. ...................... 55/16
5,137,635 8/1992 Seita et al. ................ 210/500.27 X

FOREIGN PATENT DOCUMENTS 0006030 12/1979 European Pat. Off. .
59-193102 11/1984 Japan .

Primary Examiner—Frank Spear
Attorney, Agent, or Firm—Burns, Doane, Swecker & Mathis

[57] ABSTRACT

A permeable membrane excellent in biocompatibility, produced by forming coagulation by melting method in the form of a membrane a terminal-modified polyamide, i.e. a polyether amide comprising component units represented by the following structural formula (I), (II), (III), or (IV), possessing hydrocarbon groups of one to 22 carbon atoms at the terminals thereof, and having a molecular weight in the range of from 10,000 to 100,000, said terminal-modified polyamide being such that the number of said hydrocarbon groups is in the range of from 5 to 100% based on the number of all of the terminal groups of said polyether amide, placing said membrane in contact with a medium capable of swelling or partially dissolving said membrane, and further placing the resultant altered membrane in contact with a solution consisting mainly of a nonsolvent for said polyether amide.

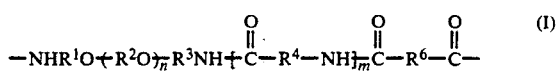

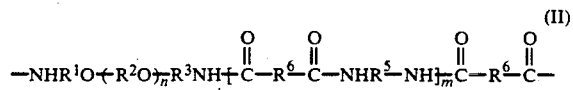

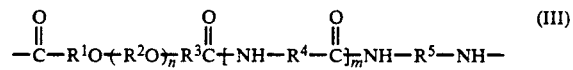

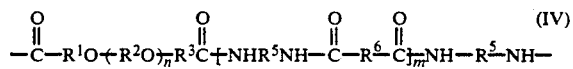

wherein $R^1$, $R^2$, and $R^3$ are independently a linear or branched alkylene group of two to four carbon atoms, $R^4$, $R^5$, and $R^6$ are independently an aliphatic, alicyclic, or aromatic hydrocarbon group of two to 36 carbon atoms, n is a numeral in the range of from 0 to 180, and m is a numeral in the range of from 1 to 400.

5 Claims, 11 Drawing Sheets

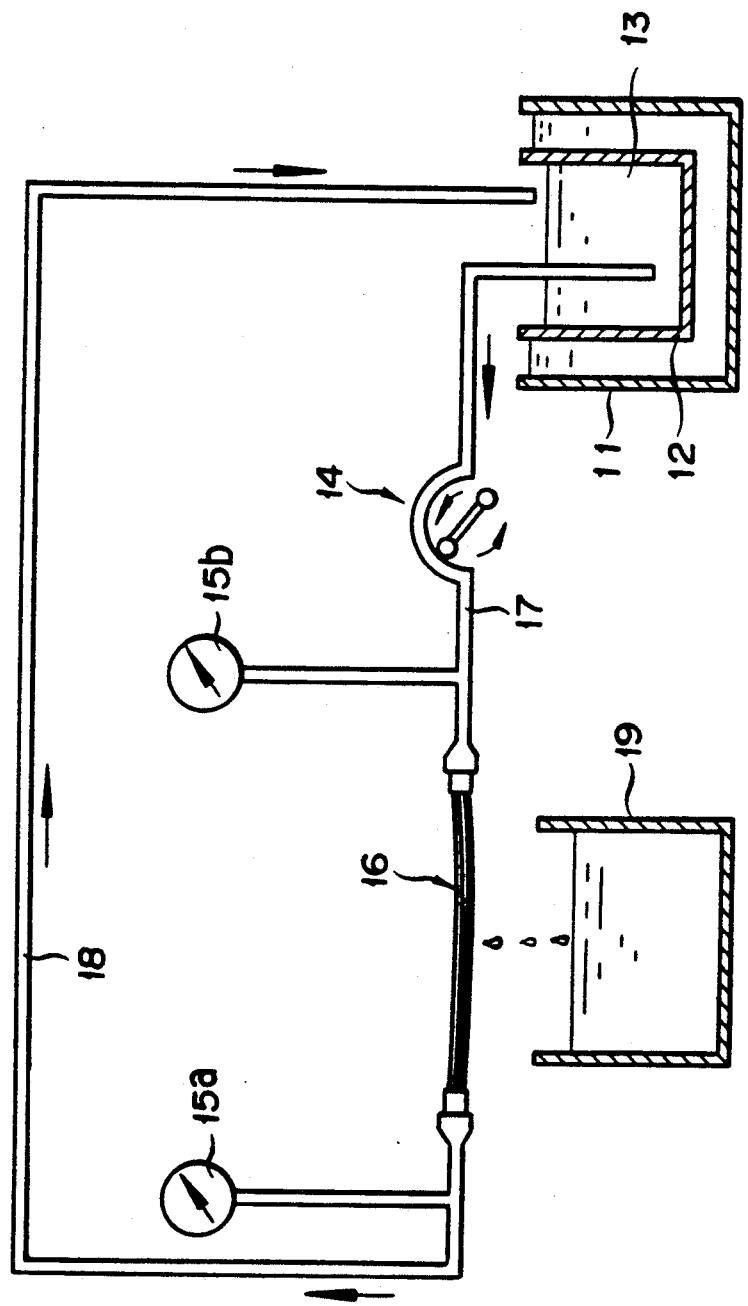

PERMEABLE MEMBRANE EXCELLENT IN BIOCOMPATIBILITY

This application is a continuation of application Ser. No. 07/721,682, filed Jun. 26, 1991, now U.S. Pat. No. 5,137,635.

BACKGROUND OF THE INVENTION

1. Field of the Invention

This invention relates to a permeable membrane. More particularly, this invention relates to a permeable membrane which excels in biocompatibility and enjoys prominent safety.

2. Description of the Prior Art

In the recent medical field, the dialysis of blood represents the segments in which the application of permeable membranes is playing an important role. The patients who have been deprived of normal renal functions and are suffering from renal diseases follow the rule of relying on the dialysis of blood to attain removal of the metabolite and surplus water which would have been excreted normally by their kidneys, keep the electrolyte in the body fluid at a fixed concentration, and maintain the acid-base equilibrium. This is why the dialysis of blood has now come to pass as the pronoun for the so-called artificial kidney. Besides, it has come to function as an important medical technique to be used for the removal of harmful chemicals from the blood of patients intoxicated with a soporific drug or an agricultural pesticide or the removal of renal toxin from patients with renal diseases.

Heretofore, such cellulose type membranes as regenerated cellulose membranes and cellulose acetate membranes have been extensively used for the dialysis of blood in such applications as described above. Through these cellulose type membranes function excellently in the purgation of low molecular substances, they do not deserve to be called fully satisfactory in terms of the purgation of medium to high molecular substances. Moreover, they have a strong possibility of inducing such immunological disorders as activation of a complement and transient leukopenia. Since the cellulose type membranes, on contact with blood, cause coagulation of the blood, they require abundant use of an anticoagulant for the prevention of the coagulation.

Further, for the purpose of eliminating these drawbacks of the cellulose type membranes, permeable membranes made of various synthetic polymers such as, for example, hydrophilic and hydrophobic polymers represented by polyvinyl alcohols, polyacrylonitrile, polysulfones, polymethyl methacrylate, and polyamides have been proposed and developed.

Though most of the permeable membranes made of these synthetic polymers excel those of cellulose type in terms of permeability, the permeable membranes made of hydrophilic polymers fail to acquire sufficient mechanical strength and those made of hydrophobic polymers entail such complexity as to require a treatment for impartation of hydrophilicity in preparation for actual use. The permeable membranes of both the two kinds are short of being fully satisfactory in terms of biocompatibility.

Besides, permeable membranes made of such copolymers as acrylonitrile-sodium methacryl sulfonate copolymer, polycarbonate-polyether block copolymer, and ethylene-vinyl alcohol copolymer which possess a hydrophilic segment and a hydrophobic segment as described in Extra Issue 84 on Chemistry, Biomedical Polymers, Kagaku Dojinsha, pp. 142-145, Handbook on Technique for Use of Membranes, Saiwai Shobo, pp. 663 to 713, and JP-A- 59-193,102(1984), for example are now in the process of development. Though the permeable membranes made of such copolymers possessing a hydrophilic segment and a hydrophobic segment as described above generally exhibit fairly satisfactory characteristics in terms of biocompatibility, they do not deserve to be called fully satisfactory and have room for further improvement in the aspects of safety, thermal stability, and mechanical strength and in such characteristic properties as permeability to water and permeability to other substances which are essentially required to be fulfilled by permeable membranes for blood.

An object of this invention, therefore, is to provide a novel permeable membrane.

Another object of this invention is to provide a permeable membrane which excels in biocompatibility and abounds in safety.

SUMMARY OF THE INVENTION

The objects described above are accomplished by a permeable membrane excellent in biocompatibility, which is produced forming coagulations by melting method in the form of a membrane a terminal-modified polyamide, i.e. a polyether amide comprising component units represented by the following structural formula (I), (II), (III), or (IV), possessing hydrocarbon groups of one to 22 carbon atoms at the terminals thereof, and having a molecular weight in the range of from about 10,000 to about 100,000, the terminal-modified polyamide being such that the number of the hydrocarbon groups is in the range of from about 5 to about 100% based on the number of all of the terminal groups of the polyether amide, placing the membrane in contact with a medium capable of swelling or dissolving the polyether amide thereby swelling or partially dissolving the membrane, and further placing the resultant altered membrane into contact with a nonsolvent for the polyether amide.

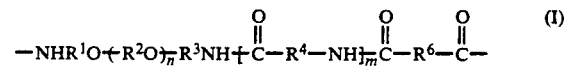

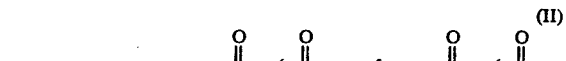

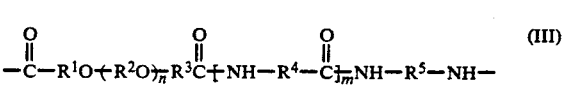

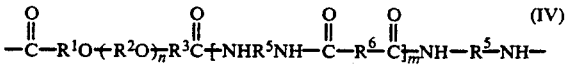

wherein $R^1$, $R^2$, and $R^3$ are independently a linear or branched alkylene group of two to four carbon atoms, $R^4$, $R^5$, and $R^6$ are independently an aliphatic, alicyclic or aromatic hydrocarbon group of two to 36 carbon atoms, n is a numeral in the range of from 0 to 180, and m is a numeral in the range of from 1 to 400.

This invention further discloses a permeable membrane produced by the method described above, wherein the medium capable of swelling or dissolving the polyether amide comprises mainly a poor solvent for the polyether amide. This invention also discloses a permeable membrane produced by the method described above, wherein the solution comprising mainly a nonsolvent for the polyether amide has water as a main component thereof. This invention also discloses a medical permeable membrane produced by the method described above, wherein the medium capable of swelling or dissolving the polyether amide is a mixture comprising dimethyl sulfoxide and dimethyl formamide at a weight ratio in the range of from 30–0:70–100 or a mixture comprising dimethyl sulfoxide and N-methyl pyrrolidone at a weight ratio in the range of from 30–0:70–100.

The objects described above are also accomplished by a permeable membrane excellent in biocompatibility, which is produced by wet molding in the form of a membrane a terminal-modified polyamide, i.e. a polyether amide comprising component units represented by the following structural formula (I), (II), (III), or (IV), possessing hydrocarbon groups of one to 22 carbon atoms at the terminals thereof, and having a molecular weight in the range of from about 10,000 to about 100,000, the terminal-modified polyamide being such that the number of the hydrocarbon groups is in the range of from about 5 to about 100% based on the number of all of the terminal groups of the polyether amide.

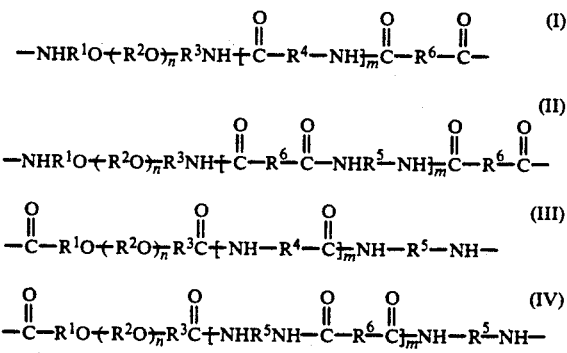

wherein $R^1$, $R^2$, and $R^3$ are independently a linear or branched alkylene group of two to four carbon atoms, $R^4$, $R^5$, and $R^6$ are independently an aliphatic, alicyclic, or aromatic hydrocarbon group of two to 36 carbon atoms, n is a numeral in the range of 0 to 180, and m is a numeral in the range of from 1 to 400.

This invention also discloses a permeable membrane produced by the method described above, wherein the solvent for the polyether amide to be used in the wet molding of a membrane is at least one member selected from the group consisting of phosphoric acid and such organic solvents as formic acid, trifluoroacetic acid, dichloroacetic acid, trichloroacetic acid hexafluoroisopropanol, methanol, N-methylpyrrolidone, dimethyl acetamide, dimethyl formamide, dimethyl sulfoxide, phenol, and 1,3-dimethyl-2-imidazolidinone, and mixtures of these solvents with not more than 5% by weight of water and/or a metal salt and the coagulating liquid is at least one member selected from the group consisting of water, glycols, and glycerol, mixtures thereof, and mixtures comprising not less than 5% by weight of these compounds and the mixtures and the balance of such organic solvents and/or metal salts as mentioned above. This invention further discloses a permeable membrane produced by the method described above, wherein the solvent to be used in the wet molding of a membrane is formic acid and the coagulating liquid is a metal salt-added hydrated alcohol. This invention further discloses a medical permeable membrane produced by the method, wherein the coagulating liquid is a water/methanol/metal salt or water/methanol dimethylsulfoxide/metal salt and the metal salt is at least one member selected from the group consisting of calcium chloride, zinc chloride, and lithium chloride.

Since the permeable membrane of this invention is produced, as described above, by forming coagulation by melting method in the form of a membrane a terminal-modified polyamide, i.e. a polyether amide comprising component units represented by the structural formula (I), (II), (III), or (IV), possessing hydrocarbon groups of one to 22 carbon atoms at the terminals thereof, and having a molecular weight in the range of from about 10,000 to about 100,000, the terminal-modified polyamide being such that the number of the hydrocarbon groups is in the range of from 5 to 100% based on the number of all of the terminal groups of the polyether amide, placing the membrane in contact with a medium capable of swelling or partially dissolving the membrane, and further placing the resultant altered membrane into contact with a nonsolvent for the polyether amide, it excels in biocompatibility as in resistance to thrombosis, exhibits ample permeability to water and to other substances, possesses high thermal stability, and succumbs only to an extremely small extent to the occurrence of harmful low molecular compounds due to the treatment in the production of polymer and the treatment in the molding of molten polymer in the form of a membrane or due to the heat treatment for sterilization. The medical permeable membrane, therefore, is advantageously used as for the dialysis of blood. The permeable membrane of this invention is allowed to manifest the characteristic features thereof mentioned above more conspicuously when, in the production thereof, the medium capable of swelling or dissolving the polyether amide comprises mainly a poor solvent for the polyether amide or a mixture comprising dimethyl sulfoxide and dimethyl formamide at a weight ratio in the range of from 30–0:70–100 or a mixture comprising dimethyl sulfoxide and N-methyl pyrrolidone at a weight ratio in the range of from 30–0:70–100 and the solution having as a main component thereof a non-solvent for the polyether amide consists mainly of water.

Further, since the permeable membrane of this invention is produced by forming coagulation by wet method in the form of a membrane a terminal-modified polyamide, i.e. a polyether amide comprising component units represented by the formula (I), (II), (III), or (IV), possessing hydrocarbon groups of one to 22 carbon atoms at the terminals thereof, and having a molecular weight in the range of from about 10,000 to about 100,000, the terminal-modified polyamide being such that the number of the hydrocarbon groups is in the range of from 5 to 100% based on the number of all of the terminal groups of the polyether amide, it excels in biocompatibility as in resistance to thrombosis, exhibits ample permeability to water and to low molecular and medium to high molecular substances, enjoys high thermal stability, and succumbs only to a very small extent the occurrence of harmful low molecular compounds due to the treatment for the production of polymer or the treatment of heat treatment for sterilization. This permeable membrane, therefore, is advantageously usable as for the dialysis of blood.

BRIEF DESCRIPTION OF THE DRAWINGS

FIG. 11 is schematic drawing illustrating a circuit determining permeability to water.

EXPLANATION OF THE PREFERRED EMBODIMENT

Figure 1:
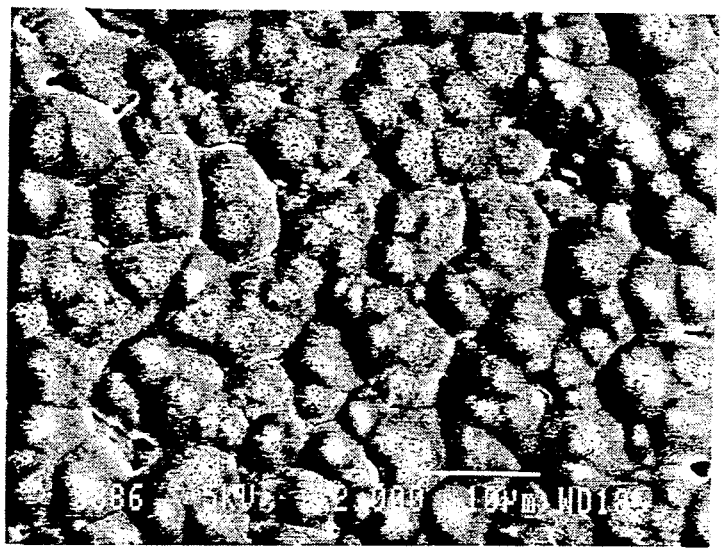
FIG. 1 is a scanning electron micrograph (2,000 magnifications) showing a fine surface structure of an embodiment of the permeable membrane of this invention.

Now, the present invention will be described in detail below with reference to working embodiments thereof.

The permeable membrane of this invention has as a matrix thereof a terminal-modified polyamide, i.e. a polyether amide comprising component units represented by the following structural formula (I), (II), (III), or (IV), possessing hydrocarbon groups of 1 to 22 carbon atoms at the terminals thereof, and having a molecular weight in the range of from about 10,000 to about 100,000, the terminal-modified polyamide being such that the number of the hydrocarbon groups is in the range of from 5 to 100% based on the number of all of the terminal groups of the polyethyer amide.

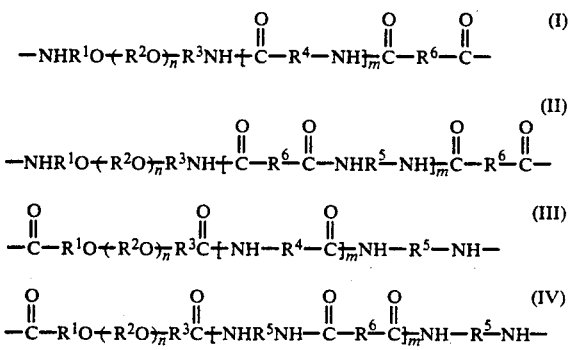

In the formulas (I) to (IV) mentioned above, $R^1$, $R^2$ and $R^3$ are independently a linear or branched alkylene group of two to four carbon atoms such as, for example, ethylene group, trimethylene group, or tetramethylene group and n is an integer in the range of from 0 to 180, preferably from 0 to 60.

In the formulas (I) to (IV) mentioned above, $R^4$ is an aliphatic, alicyclic, or aromatic hydrocarbon group of two to 36, preferably two to 11, carbon atoms, specifically the residue of lactam or aminocarboxylic acid to be used for the production of a polyamide to be described more specifically hereinafter, $R^5$ is an aliphatic, alicyclic, or aromatic hydrocarbon group of two to 36, preferably two to seven, carbon atoms, specifically the residue of a diamine to be described more specifically hereinafter, $R^6$ is an aliphatic, alicyclic, or aromatic hydrocarbon of two to 36, preferably two to 11, carbon atoms, specifically the residue of a dicarboxylic acid to be described more specifically hereinafter, and m is an integer in the range of from 1 to 400, preferably from 1 to 120.

For the purpose of imparting improved biocompatibility to the product and enabling the product to acquire mechanical strength and softness in balanced magnitudes, the polyethylene segment content in the polyether amide comprising component units represented by the general formula (I) to (IV) and used in the present invention is desired to be in the range of from 5 to 75% by weight, preferably 15 to 55% by weight.

The terminal-modified polyether amide resin to be used in the present invention is obtained by effecting terminal modification of the polyether amide comprising the component units represented by the general formula (I) to (IV) as described above by the introduction of a fixed proportion of hydrocarbon groups to the terminals of the polyether amide.

The hydrocarbon group (terminal hydrocarbon group) to be introduced as a terminal group severally to part or all of the terminals of the polyamide possesses one to 22, preferably 6 to 22, and more preferably 12 to 22, carbon atoms. The hydrocarbon groups which are usable herein include aliphatic hydrocarbon groups such as methyl group, ethyl group, propyl group, butyl group, pentyl group, hexyl group, heptyl group, octyl group, 2-ethylhexyl group, nonyl group, decyl group, undecyl group, dodecyl group, tridecyl group, tetradecyl group, tetradecylene group, pentadecyl group, hexadecyl group, heptadecyl group, octadecyl group, octadecylene group, eicosyl group, and docosyl group, alicyclic hydrocarbon groups such as cyclohexyl group, methylcyclohexyl group, and cyclohexylmethyl group, and aromatic hydrocarbon groups such as phenyl group, toluyl group, benzyl group, and β-phenylethyl group, for example. Among other hydrocarbon groups mentioned above, aliphatic hydrocarbon groups, desirably linear hydrocarbon groups, and more desirably linear alkyl groups of 12 to 22 carbon atoms, prove to be particularly preferable.

The introduction of the hydrocarbon groups to the terminals of the polyether amide is accomplished by using a monocarboxylic acid and/or a monoamine to be described specifically hereinafter in the process of the production of the polyether amide.

The terminal groups of the polyether amide of the aforementioned construction to be used in the present invention include, besides the terminal hydrocarbon groups mentioned above, the amino groups and/or carboxyl groups which originate in the raw materials used in the production of the polyether amide as described specifically hereinafter. The number of all of the terminal groups is the sum of the number of the terminal hydrocarbon groups and the number of the amino groups and/or carboxyl groups. In the terminal-modified polyether amide to be used in the medical permeable membrane of this invention, the number of the terminal hydrocarbon groups mentioned above is in the range of from 5 to 100%, preferably from 10 to 95%, and more preferably from 10 to 90%, of the total number of terminal groups. If the number of the terminal hydrocarbon groups is less than 5% of the number of the total number of terminal groups, the possibility arises that the polyether amide will be deficient in thermal stability and the polymer while being polymerized by fusion or being melted and molded in the form of a membrane or the product while being heated for sterilization will give rise to a low molecular odorous substance or low molecular compound.

From this standpoint of thermal stability, the number of hydrocarbon groups is preferably to approximate closely to 100% of the total number of terminal groups. This approximation is not easily attained from the standpoint of the production of the polyether amide. The ratio of the introduction of the terminal hydrocarbon groups, therefore, is repressed to a certain extent as described above from the industrial point of view.

The average molecular weight, Mn, of the terminal-modified polyether amide to be used in the present invention is approximately in the range of from about 10,000 to about 100,000, preferably about 15,000 to about 50,000.

The terminal-modified polyether amide to be used in the present invention, when necessary, may additionally incorporate therein a crystal seed-forming agent, a plasticizer, a heatproofing agent, an antioxidant, and other polymer, for example.

The polyether amide which comprises component units represented by the general formula (I) to (IV) and has terminals thereof modified with hydrocarbon groups can be prepared, for example, by subjecting a polyether possessing amino groups or carboxyl groups at the terminals thereof and a polyamide possessing carboxyl groups or amino groups at the terminals thereof to a condensation reaction as generally practised to effect amide bonding and, in the process of this condensation reaction, causing a monocarboxylic acid and/or a monoamine to react as a terminal modifying agent with the amino groups and carboxyl groups as the terminal groups of the polyether amide. The monocarboxylic acid and/or monoamine to be used for the terminal modification may be added to the reaction system at any stage between the time the condensation reaction is initiated and the time the reaction under a reduced pressure is started. Where the monocarboxylic acid and the monoamine are both used, they may be added simultaneously or separately to the reaction system.

The polyether having amino groups or carboxyl groups at the terminals thereof can be easily obtained, for example, by subjecting an alkylene oxide such as ethylene oxide or propylene oxide to ring-opening polymerization thereby forming a polyol such as polyethylene oxide, polypropylene oxide, or polytetramethylene oxide, and substituting an amino group and/or a carboxyl group for the terminal hydroxyl group thereof. As means for effecting the substitution of the amino group, the method which comprises directly aminating or cyanoethylating the hydroxyl group and then subjecting the product of the amination or cyanoethylation to reductive amination may be cited. As means for effecting the substitution of the carboxyl group, the method which resorts to oxidative carbonylation may be cited.

The polyamide possessing carboxyl groups or amino groups at the terminals thereof can be directly obtained by ring-opening polymerization of a lacam of a ring of at least three members, polycondensation of a polymerizable aminocarboxylic acid, or polycondensation of a dicarboxylic acid with a diamine.

The monocarboxylic acid to be used for the terminal modification generally is a monocarboxylic acid possessing approximately 2 to 23 carbon atoms. The monocarboxylic acids which are usable herein include aliphatic monocarboxylic acids such as acetic acid, propionic acid, butyric acid, valeric acid, caproic acid, enanthic acid, caprylic acid, pelargonic acid, capric acid, undecanoic acid, laurylic acid, tridecanoic acid, myristic acid, pentadecanoic acid, palmitic acid, stearic acid, arachic acid, behenic acid, myristreic acid, oleic acid, and linolic acid, alicyclic monocarboxylic acids such as cyclohexane carboxylic acid, methylcyclohexane carboxylic acid, and methyl cyclohexane carboxylic acid, and aromatic monocarboxylic acids such as benzoic acid, toluic acid, ethyl benzoic acid, and phenyl acetic acid, for example. In the place of the monocarboxylic acid, a corresponding derivative such as, for example, an acid anhydride, an ester, or an amide which can fulfil the same function as the acid may be used.

As the monoamine, a varying monoamine of one to 22 carbon atoms is used. The monoamines which are usable herein include aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, heptadecylamine, octadecylamine, eicosylamine, docosylamine, and octadecyleneamine, alicyclic monoamines such as cyclohexylamine and methylcyclohexylamine, and aromatic monamines such as benzylamine and β-phenylethylamine.

The production of the medical permeable membrane of this invention is started by first forming coagulation by melting method a polyether amide comprising component units represented by the general formula (I) to (IV) and having the terminals thereof modified with hydrocarbon groups, discharging the molten polymer through a T die or an annular die thereby molding it in a desired form such as a film or a hollow fiber, and cooling the film or hollow fiber thereby obtaining a membrane. The membrane fresh from the step of formign coagulation by melting method has a dense texture and possesses no desired permeability to substances.

Then, the membrane of the polyether amide obtained as described above is brought into contact with a medium capable of swelling or dissolving the polyether amide thereby swelling or partially dissolving the membrane.

The media which are capable of swelling or dissolving the polyether amide include phosphoric acid and organic acids such as formic acid, trifluoroacetic acid, dichloroacetic acid, and trichloroacetic acid, lower alcohols such as hexafluoroisopropanol, methanol, and ethanol, and solvents such as N-methyl pyrrolidone, dimethyl acetamide, dimethyl formamide, dimethyl sulfoxide, phenol, and 1,3-dimethyl-2-imidazolinone, combinations of these substances with metal salts such as calcium chloride, zinc chloride, lithium chloride, sodium carbonate, and copper sulfate, and mixtures thereof with minute amounts of water, glycols, and glycerin. One member or a mixture of two or more members selected from among those mentioned above may be used. When the medium capable of swelling or dissolving the polyethyl amide possesses solubility so high as to melt quickly and completely the freshly formed by emlting method membrane, it is not very preferable because the control required in causing the membrane to be swelled or partially dissolved to the extent of manifesting permeability to substances is not easily attained. The solubility of this medium is rather preferable to be such as to equal that which is manifested by what is generally called a poor solvent. When formic acid which exhibits high solubility is to be used, for example, it is preferable to be diluted with water, a nonsolvent, to a concentration not exceeding 90% by weight, preferably falling in the range of from 50 to 80% by weight, to have the solubility thereof accordingly lowered prior to use. As a medium which exhibits such preferable capability of swelling or dissolving the polyether amide as described above, it is particularly desirable to use a mixture comprising dimethyl sulfoxide and dimethyl formamide at a weight ratio in the range of 30–0:70–100 or a mixture comprising dimethyl sulfoxide and N-methyl pyrrolidone at a weight ratio in the range of 30–0:70–100.

The contact of the freshly formed by melting method membrane with the medium described above is generally attained by the treatment of immersion, though it may be effected in a gaseous phase. The conditions for this contact cannot be generally specified because they are affected by the degree of the swelling or dissolving capacity of the medium to be used or the shape, wall thickness, etc. of the membrane. When the mixture consisting of dimethyl sulfoxide and dimethyl formamide at the weight ratio mentioned above or the mixture comprising dimethyl sulfoxide and N-methyl pyrrolidone at a weight ratio in the range of from 30–0:–70–100 is used as the medium, for example, the immersion is preferable to be performed at a temperature in the range of from 80° to 150° C. for a period of from 10 to 60 minutes.

After the membrane formed by melting method as described above has been kept in contact with the medium capable of swelling or dissolving the polyether amide, it is placed in contact with a solution having as a main component thereof a nonsolvent for the polyether amide so as to remove from the membrane the residual medium adhering thereto and impart to the membrane preferred permeability to substances. The nonsolvents for the polyether amide include water, glycols, and glycerol, for example. The solution to be used for the removal of the residual medium adhering to the membrane contains one member or a mixture of two or more members selected from those mentioned above or a combination thereof with such a metal salt as calcium chloride, zinc chloride, lithium chloride, sodium carbonate, or copper sulfate. Among other solutions indicated above, the solution having water as a main component thereof proves to be particularly preferable. The contact of the membrane with the solution having as a main component thereof the nonsolvent for the polyether amide may be attained by immersion or by allowing this membrane to stand in a running body of this solution.

In the permeable membrane of this invention which is obtained as described above, countless minute continuous pores extending from the obverse surface to the reverse surface of the membrane are formed. Though the mechanism which enables the permeable membrane of this invention to manifest prominent biocompatibility as in resistance to thrombosis remains yet to be elucidated, the performance of the membrane may be logically explained by a supposition that since the matrix of this membrane is made of a polyether amide comprising component units represented by the general formula (I) to (IV), it forms a microscopic phase-separation structure consisting of a hydrophobic polyamide segment and a phydrophilic polyether segment and this microscopic phase-separation structure manifests a highly desirable ability to resist thrombosis. Further, the fact that the polyether amide comprising component units represented by the general formula (I) to (IV) is stabilized by the terminal modification thereof is believed, from the viewpoint of curbing the occurrence of low molecular substances or from the structural point of view, to contribute to imparting to the matrix the ability to resist thrombosis.

The characteristic properties of the permeable membrane of this invention are not particularly restricted. Typically, the permeability of the membrane to water is in the range of from 1.0 to 400 ml/m$^2$.hr.mmHg, preferably from 1.5 to 100 ml/m$^2$.hr.mmHg and the permeability thereof to urea (molecular weight 60), a low molecular substance, is not less than $2.70 \times 10^{-5}$ cm$^2$/min, preferably not less than $2.50 \times 10^{-5}$ cm$^2$/min.

The permeable membrane of this invention is obtained by dissolving with a good solvent a polyether amide comprising component units represented by the aforementioned general formula (I) to (IV) and having the terminals thereof modified with hydrocarbon groups, molding the resultant polyether amide solution in a desired shape as by casting the solution on a substrate, and placing the molded solution in contact with a coagulating liquid formed of a nonsolvent or poor solvent thereby extracting the good solvent from the molded membrane.

The good solvents for the polyether amide include phosphoric acid and formic acid, trifluoroacetic acid, dichloroacetic acid, trichloroacetic acid, hexafluoroisopropanol, lower alcohol such as methanol, ethanol, isopropanol and butanols, N-methyl pyrrolidone, dimethyl acetamide, dimethyl formamide, dimethyl sulfoxide, phenol, and 1,3-dimethyl-2-imidazodinone. Among other good solvents mentioned above, formic acid proves to be particularly desirable. The organic solvent selected from among those mentioned above may be used optionally in the form incorporating therein less than 20% by weight of water and/or a metal salt. The metal salts which are usable for this incorporation in the organic solvent include calcium chloride, zinc chloride, lithium chloride, sodium carbamate, and copper sulfate, for example.

In the solution which has the polyether amide dissolved in the good solvent of the foregoing description, the polymer concentration is approximately in the range of from 5 to 35% by weight, preferably from 10 to 30% by weight.

The nonsolvents or poor solvents for the polyether amide which are usable as the coagulating liquid in this invention include water, glycols, glycerol, and mixtures thereof, combinations produced by mixing not less than 5% by weight of these nonsolvents or poor solvents with the good solvents thereby moderating the coagulating action of the good solvents, and combinations produced by mixing not less than 5% by weight of these nonsolvents or poor solvents with the good solvents and further with such metal salts as calcium chloride, zinc chloride, lithium chloride, sodium carbonate, and copper sulfate, for example. Among other nonsolvents or poor solvents indicate above, water/methanol/metal salt mixtures and water/methanol/dimethyl sulfoxide/-metal salt mixtures using as the metal salt thereof at least one member selected from the group consisting of calcium chloride, zinc chloride, and lithium chloride prove to be particularly preferable. In the case of a water/methanol/metal salt mixture, the mixing ratio of water:methanol:metal salt (saturated solution) by weight is preferable to be approximately in the range of 1-90:5-70-:5-50. In the case of a water/methanol/dimethyl sulfoxide/metal salt mixture, the mixing ratio of water:methanol:dimethyl sulfoxide:metal salt (saturated solution) by weight is preferable to be approximately in the range of 1-90:5-70:5-50:5-50.

At the time that the cast polymer dope is coagulated by contact with the coagulating liquid, the temperature of the coagulating liquid is generally preferable to be in the range of from −10° to 100° C., preferably from 3° to 35° C., though it is affected by the composition of the coagulating liquid.

In the permeable membrane of this invention which is obtained as described above, countless minute through pores extending from the obverse surface to the reverse surface of the membrane are formed. Though the mechanism which enables the permeable membrane of the present invention to manifest the prominent biocompatibility as in resistance to thrombosis remains yet to be elucidated, this characteristic feature may be logically explained by a supposition that since the matrix of the membrane is made of a polyether amide comprising component units represented by the general formula (I) to (IV), it forms a microscopic phase-separation structure comprising a hydrophobic polyamide segment and a hydrophilic polyether segment and this microscopic phase-separation structure manifests a highly preferable ability to resist thrombosis. Further, the fact that the polyether amide is stabilized by the terminal modification is believed from the viewpoint of curbing the occurrence of a low molecular substance and from the structural point of view to contribute to the enhancement of the ability to resist thrombosis.

That is, important thing in the present invention is that surface (blood contacting surface) of polyether amide layer forms sphaelite (globulitic structure). By such structure excellent thrombosis resistance is exhibited.

The sphaelite means a form of polymer which is crystallized in one globe by growing fibril around the seed as a center, and it appears as a semi-globular or a similar protuberance by observation of scanning election microscope (SEM).

Although exact principle that the excellent thrombosis resistance can be attained by the globulitic structure is not clear, it is presumed that arrangement of crystal portion and amorphous portion are completed and clear microphase separation structure is appeared.

The characteristic properties of the permeable membrane of this invention are not particularly restricted. Typically, the permeability of this membrane to water is preferable to be in the range of from 1 to 400 ml/m$^2$.hr.mmHg, preferably 1.5 to 100 ml/m$^2$.hr.mmHg, the permeability thereof to urea (molecular weight 60), a low molecular substance, to be not less than $2.00 \times 10^{-5}$ cm$^2$/min, preferably not less than $2.50 \times 10^{-5}$ cm$^2$/min, and the permeability thereof to vitamin B$_{12}$ (molecular weight 1,355), a medium molecular substance, to be not less than $60 \times 10^{-5}$ cm$^2$/min, preferably not less than $0.70 \times 10^{-5}$ cm$^2$/min.

Now, the present invention will be described more specifically below with reference to working examples.

EXAMPLE 1

A polyether amide (Mn about 20,600, polyether content 44% by weight, and terminal modification ratio 31%) obtained by subjecting a polyamide resulting from polycondensation of hexamethylene diamine with sebacic acid to a condensation reaction with bis(3-amidopropyl)polytetrahydrofuran thereby effecting amide bonding and subsequently modifying the terminals of the product of the condensation with stearyl amine was supplied to an extruding device provided with a T die, melted and kneaded therein, extruded through the T die, introduced into water, cooled and coagulated therein to form a membrane. The extrusion molding was carried out at a melting temperature in the range of from 230° to 240° C. and a T die temperature of 240° C., a screw rotational speed of 52.0 rpm, and a cooling roll rotational speed of 2.5 m/min.

The membrane (thickness 80 μm) consequently obtained was subjected to 60 minutes immersion in a mixture comprising dimethyl sulfoxide and dimethyl formamide at a weight ratio of 10/90 and kept at 100° C. It was subsequently treated by immersion in a water bath kept at 20° C., to obtain a sample.

By observation under a scanning electron microscope (SEM), the surface of the produced membrane was found to possess a globulitic structure as illustrated in FIG. 1.

The permeability of the produced membrane to water was 3.0 ml/m$^2$.hr.mmHg and that to urea was $4.29 \times 10^{-5}$ cm$^2$/min.

The membrane was tested for thrombocyte dilation capacity by the method to be described hereinafter. The results are shown in Table 1.

EXAMPLE 2

A sample was obtained by following the procedure of Example 1, except that a mixture comprising dimethylsulfoxide and dimethyl formamide at a weight ratio of 5/95 was used in the place of the 10/90 dimethyl sulfoxide/dimethyl formamide mixture.

The permeability of the produced membrane to water was 16.1 ml/m$^2$.hr.mmHg and that to urea was $5.92 \times 10^{-5}$ cm$^2$/min.

EXAMPLE 3

A sample was obtained by following the procedure of Example 1, except that a mixture comprising dimethyl sulfoxide and N-methyl pyrollidone at a weight ratio of 20/80 was used in the place of the 10/90 dimethyl sulfoxide/dimethyl formamide mixture.

The permeability of the produced membrane to water was 4.3 ml/m$^2$.hr.mmHg and that to urea was $7.27 \times 10^{-5}$ cm$^2$/min.

EXAMPLE 4

A sample was obtained by following the procedure of Example 3, except that a mixture comprising dimethyl sulfoxide and N-methyl pyrrolidone at a weight ratio of 10/90 was used in the place of the 20/80 dimethyl sulfoxide/N-methyl pyrrolidone mixture.

The permeability of the produced membrane to water was 7.9 ml/m$^2$.hr.mmHg and that to urea was $10.3 \times 10^{-5}$ cm$^2$/min.

A sample was obtained by following the procedure of Example 3, except that a mixture comprising dimethyl sulfoxide and N-methyl pyrrolidone at a weight ratio of 5/95 was used in the place of the 20/80 dimethyl sulfoxide/N-methyl pyrrolidone mixture.

The permeability of the produced membrane to water was 1.8 ml/m$^2$.hr.mmHg and that to urea was $3.48 \times 10^{-5}$ cm$^2$/min.

Control 1

A permeable membrane made of regenerated cellulose and having a thickness of 27 μm (produced by ENKA K.K. and marketed under product code of "PT-150") was tested for permeability to water and permeability to urea by the method to be described specifically hereinafter in the same manner as in Example 1. Consequently, the permeability of this membrane to water was 3.0 ml/m².hr.mmHg and that to urea was $2.70 \times 10^{-5}$ cm²/min.

Control 2

A commercially available polypropylene film (produced by Nimura Kagaku K.K. and marketed under product code of "FOP #60") was tested for thrombocyte capacity in the same manner as in Example 1. The results are shown in Table 1.

Control 3

A sample for comparison was obtained by dissolving an ethylene-vinyl alcohol copolymer (ethylene content 33 mol %; produced by Kuraray K.K.) in an amount calculated to account for a concentration of 5% by weight in dimethyl sulfoxide (DMSO) at 75° C., casting the resultant dope in a uniform thickness on a glass plate, and immediately vacuum drying the cast dope at 75° C. The membrane thus obtained was tested for platelet dilation capacity in the same manner as in Example 1. The results are shown in Table 1.

TABLE 1

| | Polymer | Form of deposited platelet | | |
|---|---|---|---|---|
| | | Ia form | Ib form | II form |
| Example 1 | mPEA | 6 | 4 | 13 |
| Control 2 | PP | 5 | 2 | 115 |
| Control 3 | EVA | 5 | 12 | 16 | mPEA: Terminal-modified polyether amide
PP: Polypropylene
EVA: Ethylene-vinyl alcohol copolymer It is clearly noted from Table 1 that the permeable membrane of Example 1 conforming to the present invention showed a generally small deposition of thrombocyte and a conspicuously small deposition (II form) particularly in an activated state as compared with the permeable membranes of Control 2 and Control 3. It is, therefore, safe to conclude that it possessed outstanding ability to resist thrombosis.

The various physical constants indicated in this specification were determined and tested by the following methods.

Figure 10:
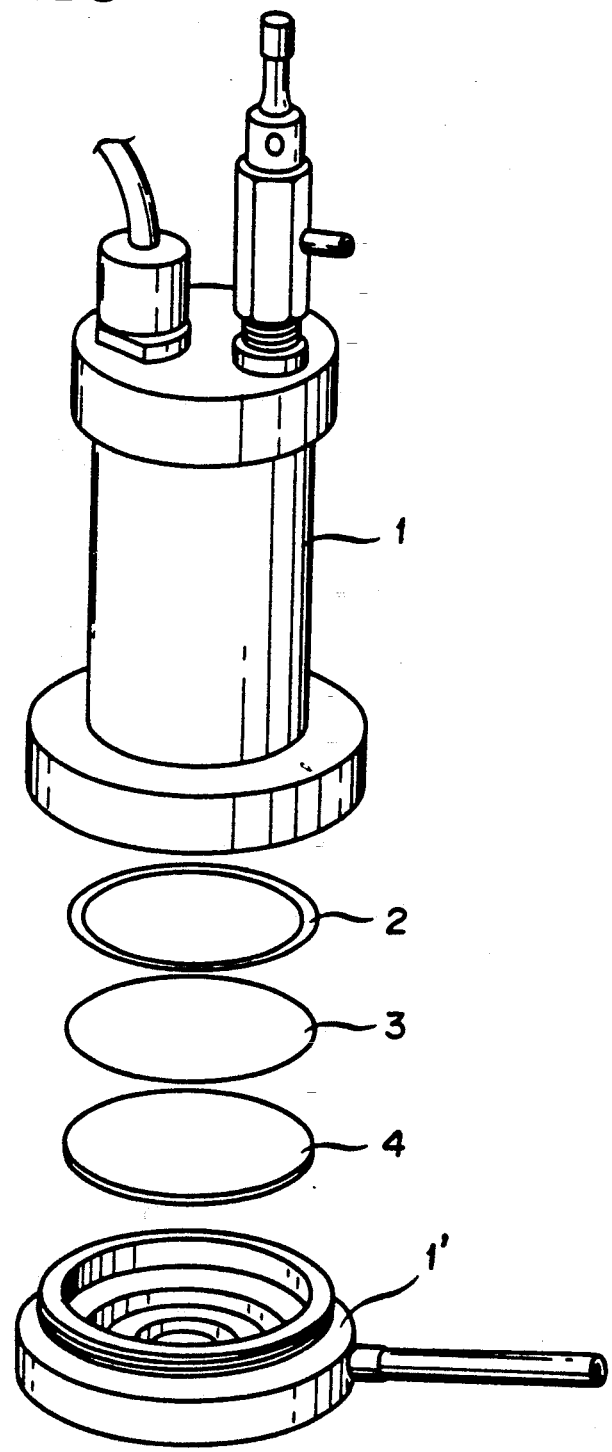
FIG. 10 is a perspective view illustrating the construction of an apparatus for the determination of the amount of water passed through a membrane.

Permeability to water:

A flat sample membrane punched out in a diameter of 43 mm was set in a cell as illustrated in FIG. 10. By the use of distilled water adjusted at 37±1° C., the membrane was subjected to air pressure at 250 mmHg (fluctuation within 10%) in an atmosphere kept at 37±1° C. The membrane was left standing in this state for 30 minutes. Then, the relation between the amount of distilled water flowing out of the membrane and the elapsed time was found and the permeability to water was computed consequently.

Permeability to substance (urea):

In a cell designed so that distilled water and an aqueous solution containing urea in a concentration of 100 mg/dl (each 50 ml in volume) were opposed to each other across a flat sample membrane punched in a circular shape, the liquids were independently kept stirred at a fixed speed. After 30 minutes and 150 minutes stirring, the liquids were samples and analyzed for concentration of substances contained therein. The permeability of the sample membrane was calculated in accordance with the following formula using the concentrations consequently found and the membrane thickness.

Permeability to urea, $P = P' \cdot L$ (cm²/min) wherein L = membrane thickness (cm), $$P = -\frac{1}{\left(\frac{1}{V_1} + \frac{1}{V_2}\right)} \ln \frac{1 - \frac{C_2}{C_1}}{1 + \frac{V_2 C_2}{V_1 C_1}} \text{ (cm/min)}$$

$C_1$ and $C_2$: Concentrations of solutes in cells after the elapse of t minutes,
$V_1$, $V_2$: Volumes of solutes, and
t: Time of measurement The determination of urea was carried out by the use of the urease indophenol method.

Test for platelet dilation capacity:

Blood was extracted from the vein in the elbow with a syringe containing an aqueous solution of 3.8 w/v sodium citrate in an amount calculated to account for 1/9 of the collected blood. The sodium citrate-added blood so extracted was centrifuged at 800 rpm for five minutes to separate PRP (platelet rich blood plasma). The number of platelets in the PRP was determined with an eight-item blood tester (produced by Olson Instruments Corp. and marketed under product code of "ELT-S"). The blood remaining after the separation of PRP was further centrifuged at 3,000 rpm for 10 minutes to collect PPP (platelet deficient blood plasma). The PPP thus obtained was diluted with the PRP so as to adjust the number of platelets to 10.5/µl.

A sample permeable membrane was cut into pieces of the square of 8 mm. The square pieces were applied on a SEM base and the diluted PRP of the adjusted number of thrombocytes was dropped in a fixed volume of 200 ul on the square pieces. The wet square pieces were pressed with the lid of a petri dish (made of polystyrene) so as to adjust the thickness of the PRP layer to 2 mm. The square pieces were left standing in the ensuant state at normal room temperature (25°±2° C.) for 30 minutes. Subsequently, the test pieces were lightly washed with a saline 0.01M phosphate solution of pH 7.0 (PBS)/3.8 w/v % sodium citrate mixture (weight ratio 9/1) and then fixed in a PBS 1 w/v % glutar aldehyde solution at 4° C. (2° to 8° C.) over a whole day and night. The fixed test pieces were washed with PBS, further washed with distilled water, and freeze dried. The test pieces were then subjected to ion spattering (12 kV) for six minutes and photographed in five fields with a SEM at 1,000 magnifications. By examination of the photographs, the form of deposited thrombocytes was classified by the following standard and the number of deposited thrombocytes was calculated.

Classification of form:
I. Inactive deposition
   a. Normal disc-like deposition
   b. Globulized deposition not deformed to the extent of producing pseudopodium
II. Active deposition
   Deposition with production of elongated pseudopodium

EXAMPLE 6

In 351 g of formic acid (99 w/v %), 99 g of a polyether amide (Mn about 20,000, polyether content 25% by weight, and terminal modification ratio 31%) obtained by subjecting a polyamide resulting from polycondensation of hexamethylene diamine with sebacic acid to a condensation reaction with diaminopolypropylene oxide thereby effecting amide bonding and further modifying the terminals of the product of the condensation reaction with stearyl amine was dissolved by heating, to obtain a solution containing the polymer in a concentration of 22% by weight. The solution was left standing at 30° C. for two hours for deaeration.

This solution in a gaseous phase was cast in a fixed thickness on a substrate, immediately coagulated by five minutes immersion in a coagulating liquid comprising $CaCl_2$, methanol, and water (at a weight ratio of 1/3/5) and adjusted at 5° C., and subsequently washed with running water to remove the residual formic acid and coagulating liquid adhering to the coagulated membrane and obtain a sample. The membrane thus obtained had a thickness of 49 $\mu$m in the wet state.

Figure 2A:
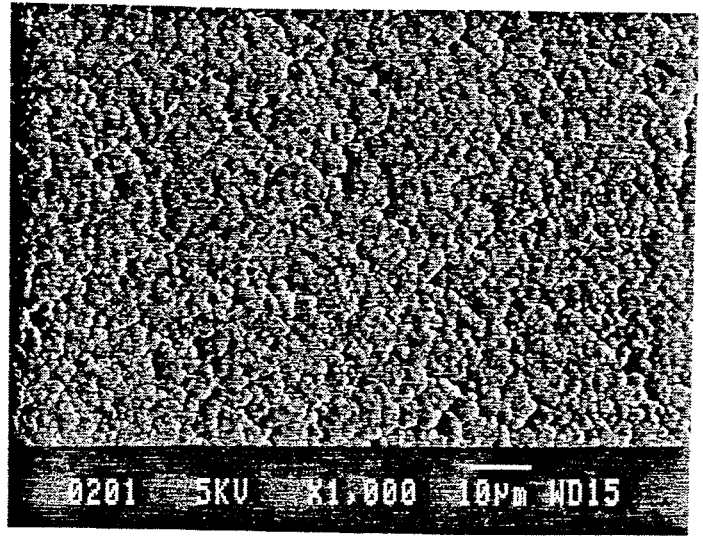
FIGS. 2A to 9B are scanning electron micrographs (1,000 magnifications) showing a fine surface structure of other embodiments of the permeable membrane of this invention; in each of the figures, the micrograph indicated by A represents the obverse surface of a membrane, the micrograph indicated by B the reverse surface of a membrane, and the micrograph indicated by C the cross section of a membrane.
Figure 2B:
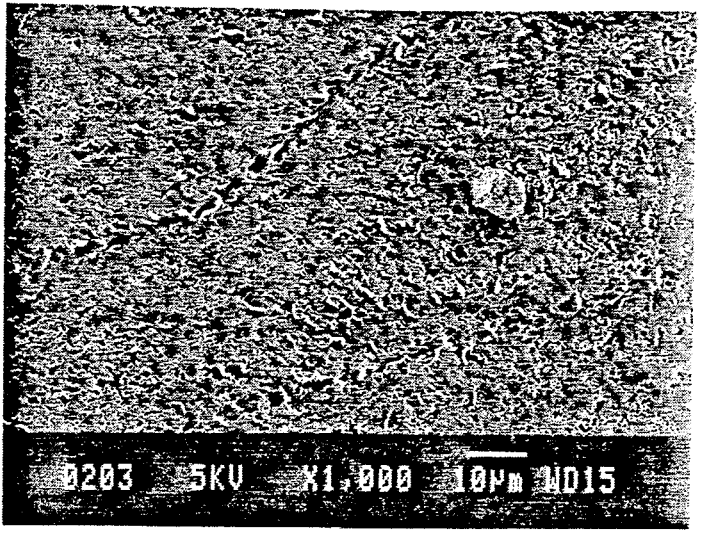
Figure 2C:
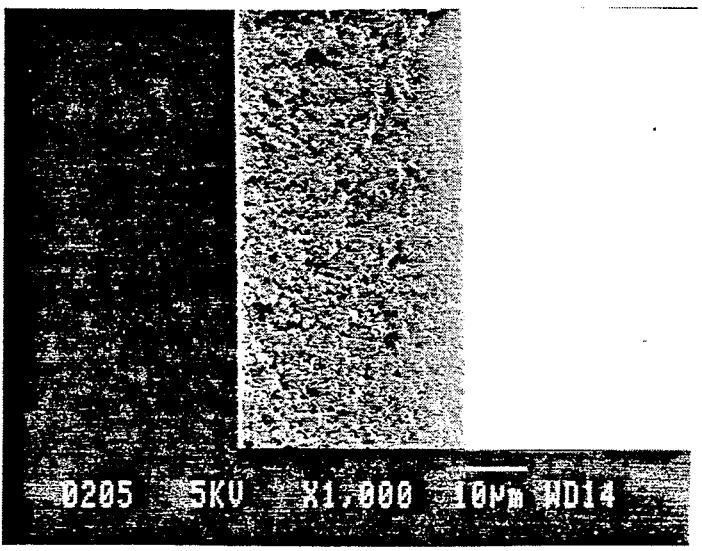

By observation under a scanning electron microscope (SEM), the surface of the membrane was found to possess a globulitic structure. FIG. 2A illustrates the SEM photograph of the obverse surface of this membrane, FIG. 2B that of the reverse surface thereof, and FIG. 2C that of the cross section thereof.

The permeability of the membrane to water was 28 ml/$m^2$.hr.mmHg, that to urea was $5.2 \times 10^{-5}$ $cm^2$/min, and that to vitamin $B_{12}$ was $1.1 \times 10^{-5}$ $cm^2$/min.

The membrane was further tested for platelet dilation capacity by the method described above. The results are shown in Table 3.

EXAMPLE 7

A membrane was produced by following the procedure of Example 1, except that the polyether amide was obtained in the same manner as in Example 6 except that for a change of the terminal modification ratio to 47% and the temperature of the coagulating liquid was changed to 10° C. The label had a thickness of 37 $\mu$m in the wet state.

Figure 3A:
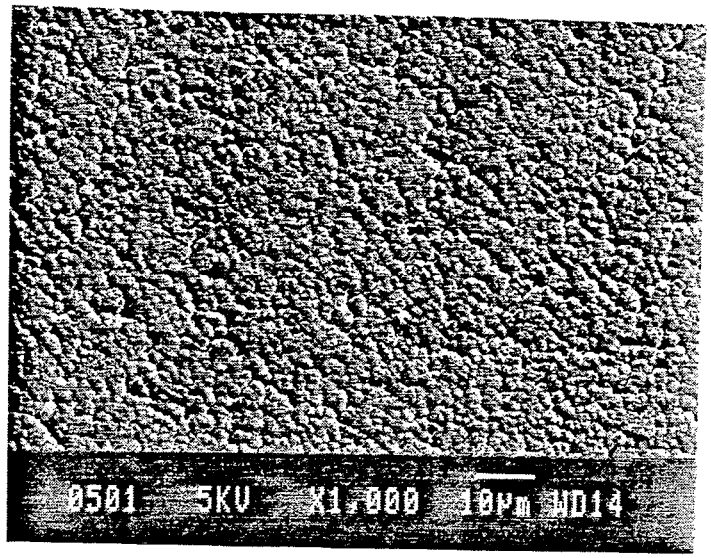
Figure 3B:
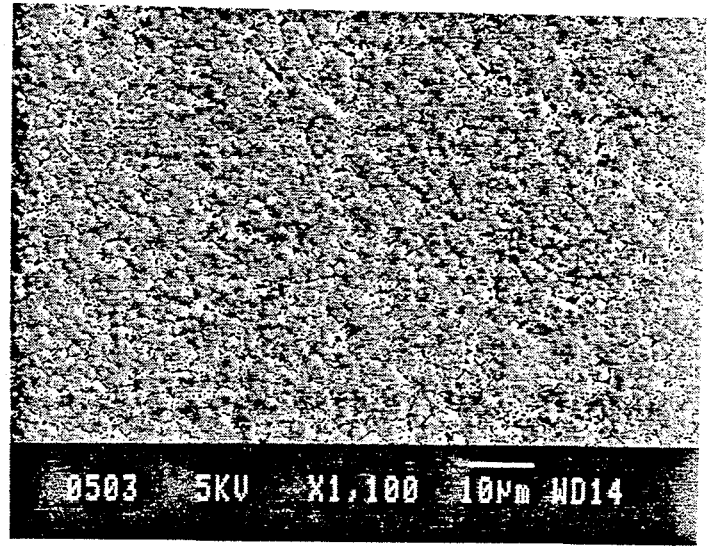
Figure 3C:
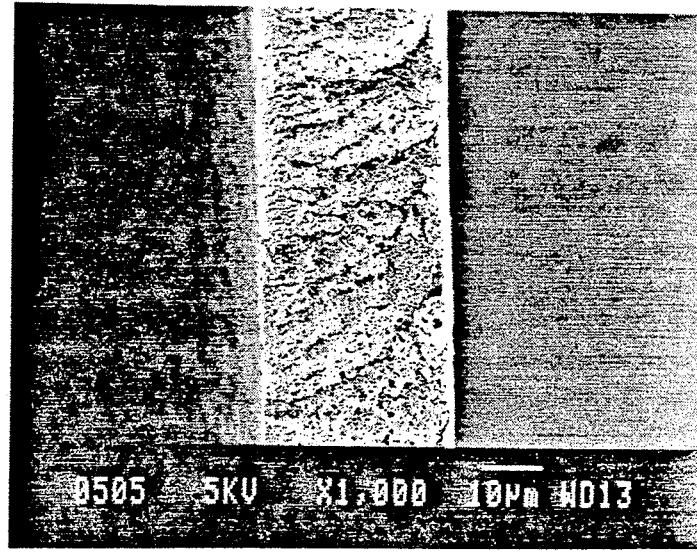

By observation under a scanning electron microscope (SEM), the surface of the membrane was found to possess a globulitic structure similarly to that of the membrane of Example 6. FIG. 3A illustrates the SEM photograph of the obserse surface of this membrane, FIG. 3B that of the reverse surface thereof, and FIG. 3C that of the cross section thereof.

The permeability of this membrane to water, urine, and vitamin $B_{12}$ was tested by the method described above. The results are shown in Table 2.

The membrane was further tested for platelet dilation capacity by the method described above. The results are shown in Table 3.

EXAMPLE 8

A membrane was produced by following the procedure of Example 6, except that the temperature of the coagulating liquid was changed to 15° C. The membrane had a thickness of 49 $\mu$m in the wet state.

Figure 4A:
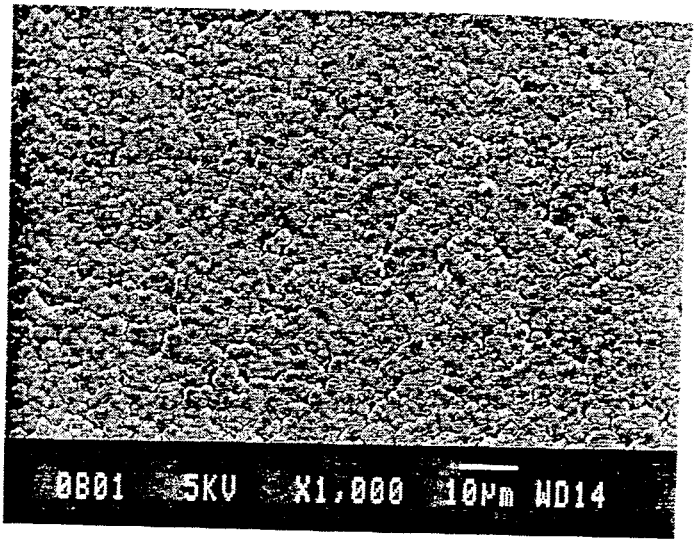
Figure 4B:
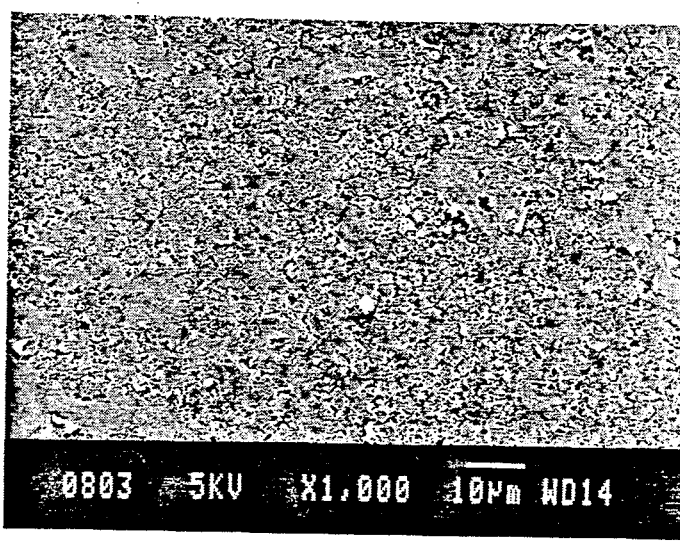
Figure 4C:
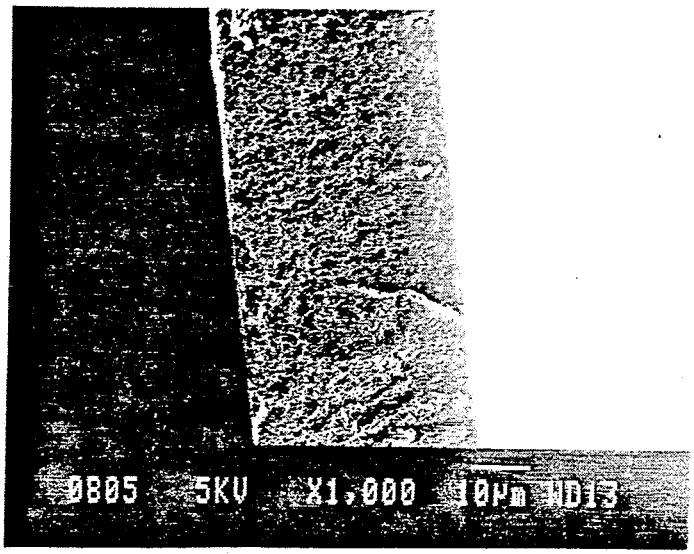

By observation under a scanning electron microscope (SEM), the surface of the membrane was found to possess a globulitic structure similarly to that of the membrane of Example 6. FIG. 4A illustrates the SEM photograph of the obverse surface of this membrane, FIG. 4B that of the reverse surface thereof, and FIG. 4C that of the cross section thereof.

The permeability of the membrane to water, urea, and vitamin $B_{12}$ was tested by the method described above. The results are shown in Table 2.

EXAMPLE 9

A membrane was produced by following the procedure of Example 6, except that the composition of the coagulating liquid was changed to a mixture consisting of $CaCl_2$, methanol, and water at a weight ratio of 2/3/7 and the temperature of the coagulating liquid was changed to 10° C. The membrane had a thickness of 49 $\mu$m in the wet state.

Figure 5A:
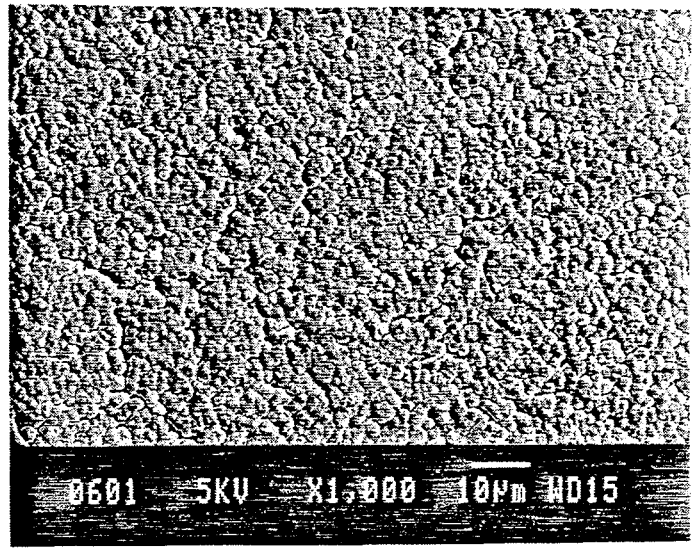
Figure 5B:
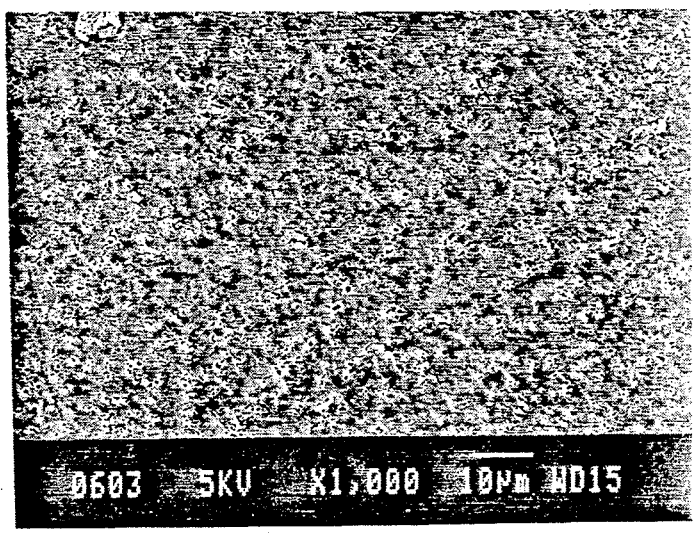
Figure 5C:
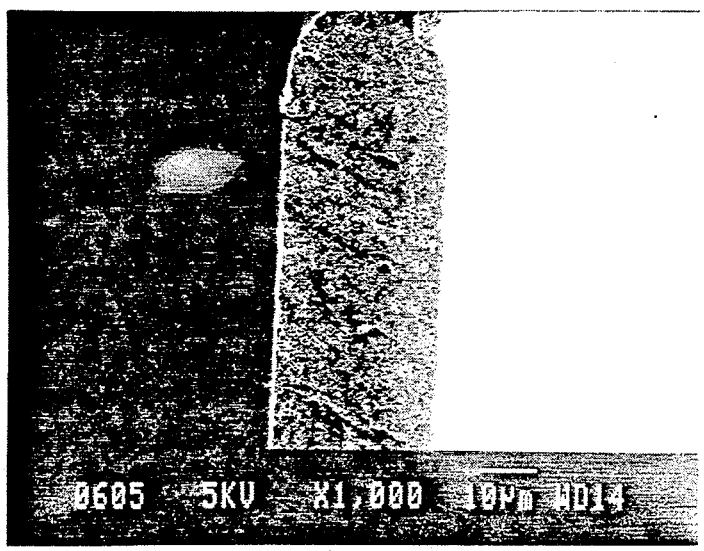

By observation under a scanning electron microscope (SEM), the surface of this membrane was found to possess a globulitic structure similarly to that of the membrane of Example 6. FIG. 5A illustrates the SEM photograph of the obverse surface of this membrane, FIG. 5B that of the reverse surface thereof, and FIG. 5C that of the cross section thereof.

The permeability of this membrane to water, urea, and vitamin $B_{12}$ was tested by the method described above. The results are shown in Table 2.

EXAMPLE 10

A membrane was produced by following the procedure of Example 9, except that the temperature of the coagulating liquid was changed to 15° C. The membrane had a thickness of 42 $\mu$m in the wet state.

Figure 6A:
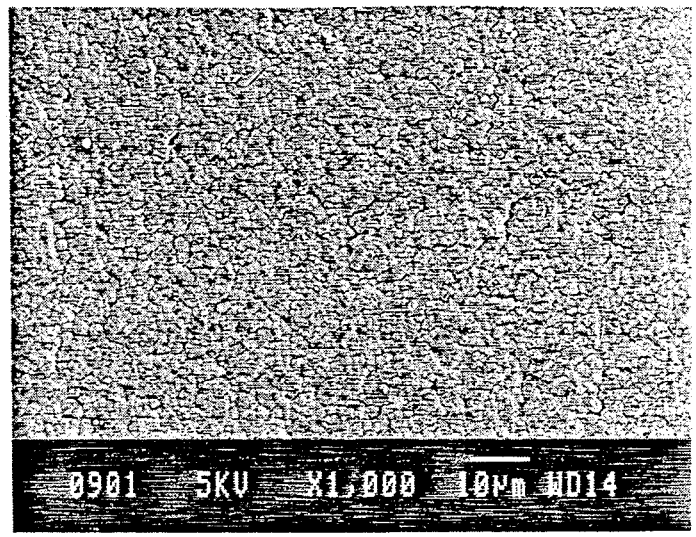
Figure 6B:
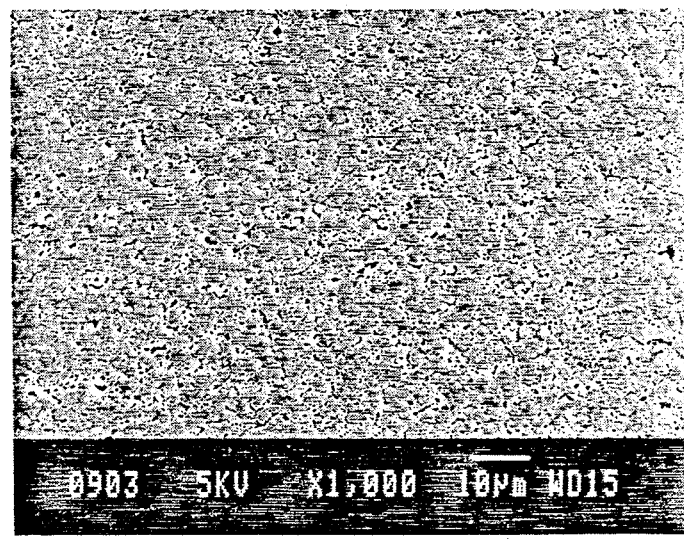
Figure 6C:
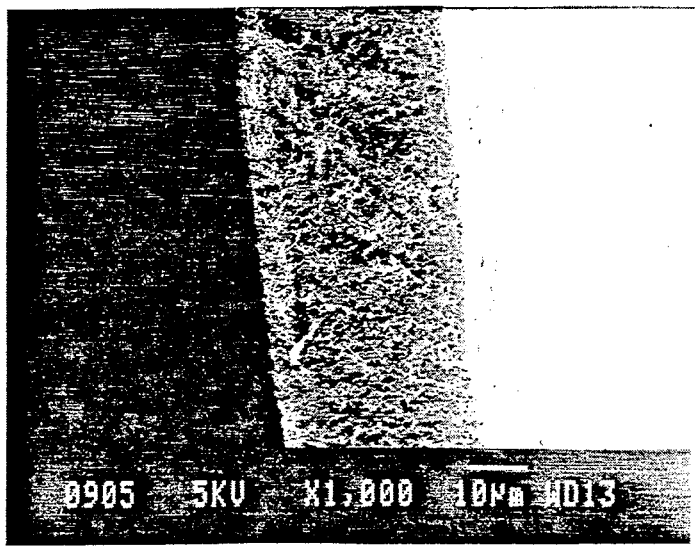

By observation under a scanning electron microscope (SEM), the surface of the membrane was found to possess a globulitic structure similarly to that of the membrane of Example 9. FIG. 6A illustrates the SEM photograph of the obverse surface of the membrane, FIG. 6B that of the reverse surface thereof, and FIG. 6C that of the cross section thereof.

The permeability of this membrane to water, urea, and vitamin $B_{12}$ was tested by the method described above. The results are shown in Table 2.

EXAMPLE 11

A membrane was produced by following the procedure of Example 6, except that the composition of the coagulating liquid was changed to a mixture consisting of $CaCl_2$, methanol, and water at a weight ratio of 2/3/5. The membrane had a thickness of 62 $\mu$m in the wet state.

Figure 7A:
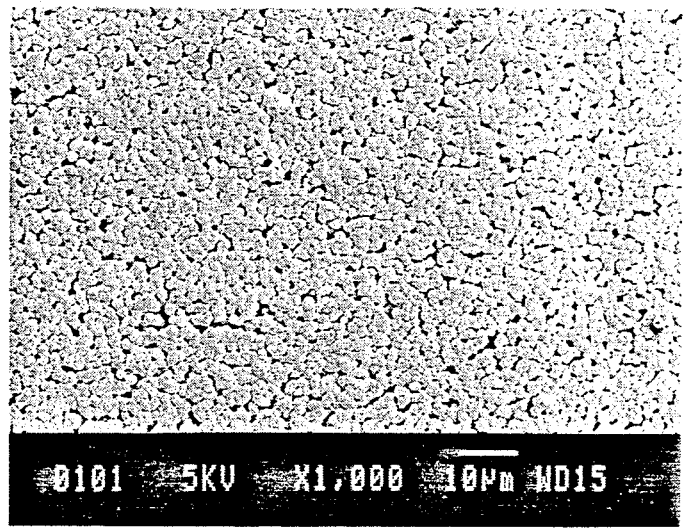
Figure 7B:
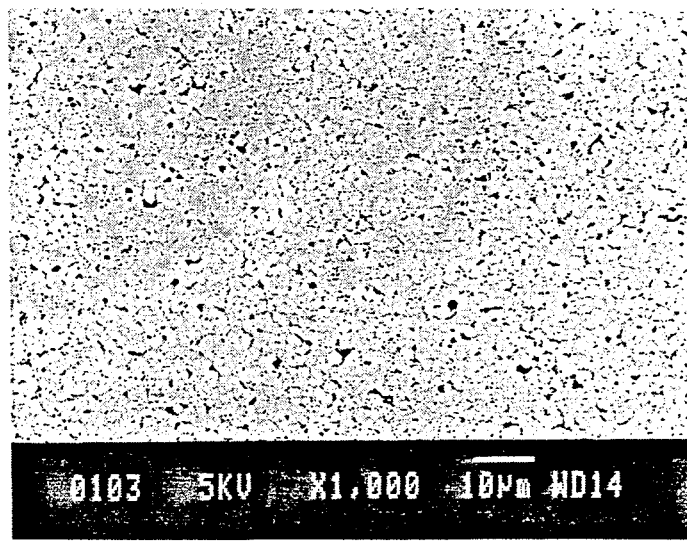
Figure 7C:
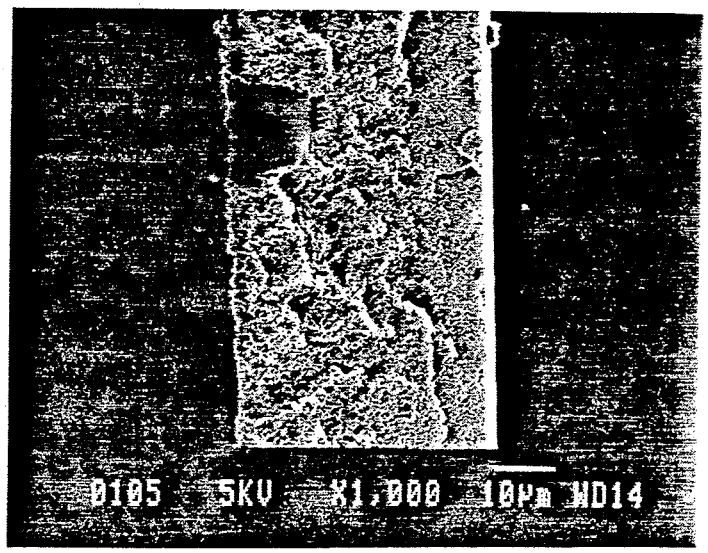

By observation under a scanning electron microscope (SEM), the surface of the membrane was found to possess a globulitic structure similarly to that of the membrane of Example 6. FIG. 7A illustrates the SEM photograph of the obverse surface of this membrane, FIG. 7B that of the reverse surface thereof, and FIG. 7C that of the cross section thereof.

The permeability of this membrane to water, urea, and vitamin $B_{12}$ was tested by the method described above. The results are shown in Table 2.

EXAMPLE 12

A membrane was produced by following the procedure of Example 6, except that the composition of the coagulating liquid was changed to a mixture consisting of $CaCl_2$, methanol, and water at a weight ratio of 2/5/5. The membrane had a thickness of 56 $\mu$m in the wet state.

Figure 8A:
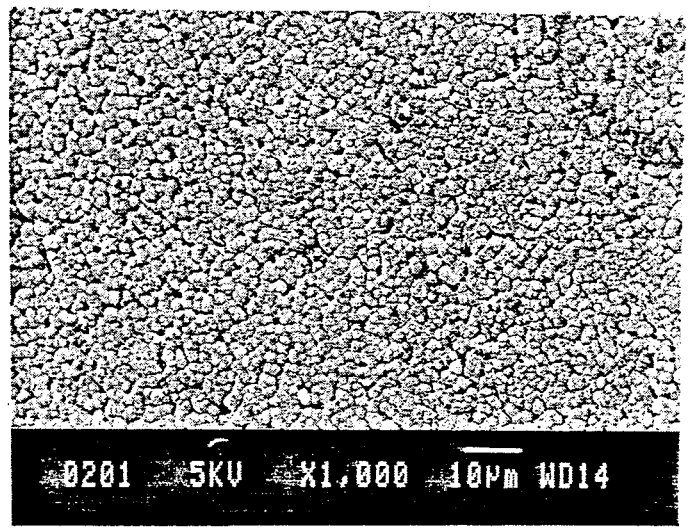
Figure 8B:
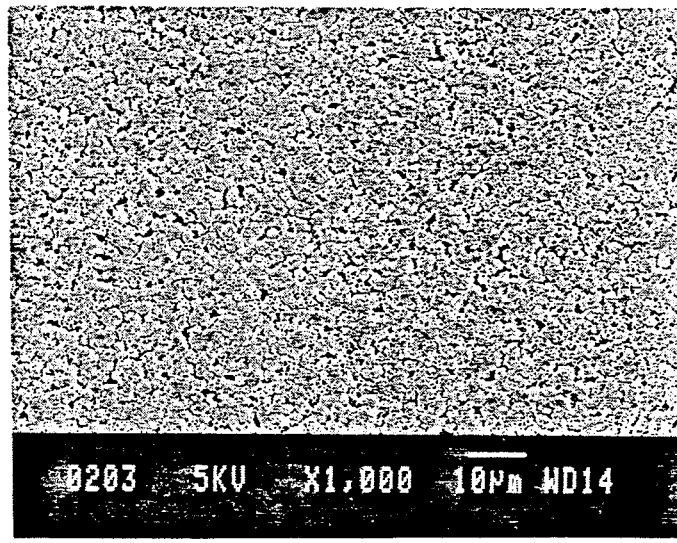
Figure 8C:
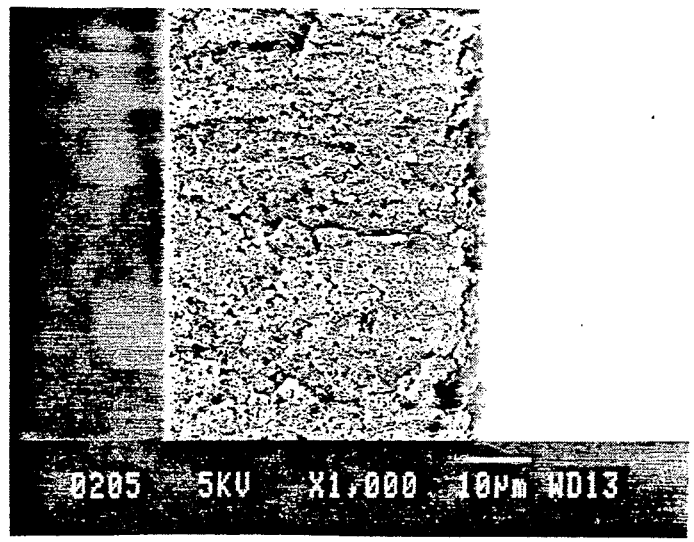

By observation under a scanning electron microscope (SEM), the surface of the membrane was found to possess a globulitic structure similarly to that of the membrane of Example 6. FIG. 8A illustrates the SEM photograph of the obverse surface of this membrane, FIG. 8B that of the reverse surface thereof, and FIG. 8C that of the cross section thereof.

The permeability of this membrane to water, urea, and vitamin $B_{12}$ was tested by the method described above. The results are shown in Table 2.

EXAMPLE 13

A membrane was produced by following the procedure of Example 6, except that the composition of the coagulating liquid was changed to a mixture consisting of $ZnCl_2$, methanol, and water at a weight ratio of 2/3/5. The membrane had a thickness of 75 μm in the wet state.

Figure 9A:
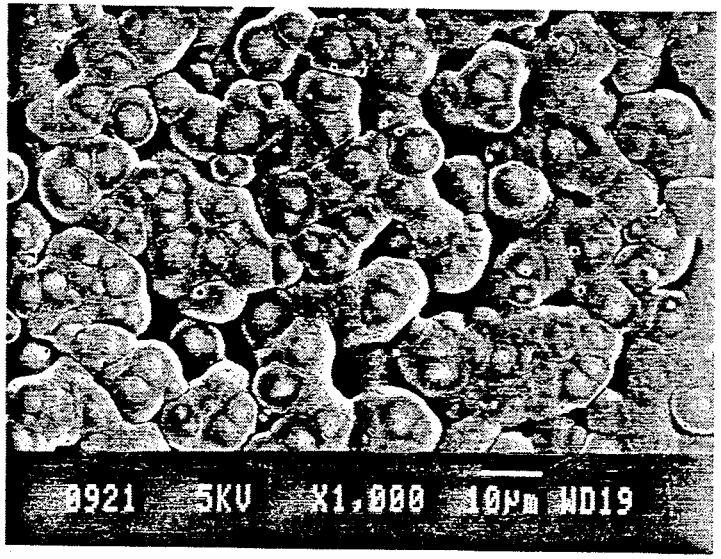
Figure 9B:
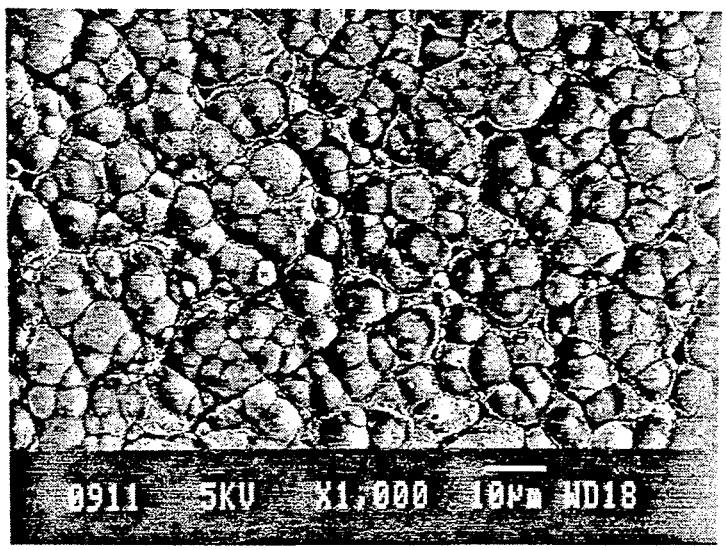

By observation under a scanning electron microscope (SEM), the surface of this membrane was found to possess a globutilic structure similarly to that of the membrane of Example 6. FIG. 9A illustrates the SEM photograph of the obverse surface of the membrane, and FIG. 9B that of the reverse surface thereof.

The permeability of this membrane to water, urea, and vitamin $B_{12}$ was tested by the method described above. The results are shown in Table 2.

EXAMPLE 14

A membrane was produced by following the procedure of Example 6, except that the composition of the coagulating liquid was changed to a mixture consisting of $ZnCl_2$, methanol, water, and dimethyl sulfoxide at a weight ratio of 14/21/35/30. The membrane had a thickness of 80 μm in the wet state.

By observation under a scanning electron microscope (SEM), the surface of this membrane was found to possess a globutilic structure similarly to that of the membrane of Example 6.

The permeability of this membrane to water, urea, and vitamin $B_{12}$ was tested by the method described above. The results are shown in Table 2.

EXAMPLE 15

A membrane was produced by following the procedure of Example 6, except that the composition of the coagulating liquid was changed to a mixture consisting of $CaCl_2$, methanol, and water at a weight ratio of 2/3/2. The membrane had a thickness of 65 μm in the wet state.

The permeability of the membrane to water, urea, and vitamin $B_{12}$ was tested by the method described above. The results are shown in Table 2. The membrane was further tested for thrombocyte dilation capacity by the method described above. The results are shown in Table 3.

Control 4

A permeable membrane made of regenerated cellulose and having a thickness of 27 μm (produced by ENKA K.K. and marketed under product code of "PT-150") was tested for permeability to water, urea, and vitamin $B_{12}$ by the method described above. The results are shown in Table 2.

Control 5

A commercially available polypropylene film (produced by Nimura Kagaku K. K. and marketed under product code "FOP #60") was tested for thrombocyte dilating capacity by the method described above. The results are shown in Table 3.

Control 6

A membrane was produced by dissolving nylon 610 (Mn=20,000) in hexafluoroisopropanol thereby preparing a polymer solution having a polymer concentration of 5% by weight at 40° C., casting the resultant dope in a uniform thickness on a glass plate, heating the cast layer of the dope in an oven at 40° C. thereby effecting thorough vaporization of hexafluoroisopropanol, and vacuum drying the resultant layer at normal room temperature. The membrane thus obtained was tested for thrombocyte dilation capacity by the method described above. The results are shown in FIG. 3.

TABLE 2

|  | Permeability to water [ml/m² · hr · mmHg] | Permeability to substance [×10⁻⁵ cm²/min] | |
| --- | --- | --- | --- |
|  |  | Urea | Vitamin B12 |
| Example 6 | 28 | 5.2 | 1.10 |
| Example 7 | 52 | 5.0 | 1.20 |
| Example 8 | 63 | 6.3 | 1.60 |
| Example 9 | 17 | 4.5 | 0.96 |
| Example 10 | 27 | 3.7 | 0.95 |
| Example 11 | 19 | 3.9 | 0.76 |
| Example 12 | 41 | 6.0 | 0.98 |
| Example 13 | 27 | 5.1 | 0.83 |
| Example 14 | 14 | 2.9 | 0.94 |
| Example 15 | 68 | 8.6 | 1.75 |
| Control 4 | 3 | 2.7 | 0.56 |

TABLE 3

|  | Polymer | Form of deposition of thrombocyte | | |
| --- | --- | --- | --- | --- |
|  |  | Ia form | Ib form | II form |
| Example 6 | mPEA | 7 | 4 | 16 |
| Example 7 | mPEA | 6 | 3 | 11 |
| Example 15 | mPEA | 1 | 5 | 5 |
| Control 5 | PP | 2 | 2 | 143 |
| Control 6 | PA | 3 | 4 | 94 | mPEA: Terminal-modified polyether amide
PP: Polypropylene
PA: Polyamide (nylon 610)

It is clearly noted from the results shown in Table 2 that the permeable membranes of Examples 6 to 15 conforming to the present invention possessed notably high degrees of permeability to water and to medium molecular substances as compared with the conventional permeable membrane of regenerated cellulose.

It is further noted clearly from the results shown in Table 3 that the permeable membranes of Examples 6, 7 and 15 conforming to the present invention produced generally small deposition of thrombocytes and conspicuously small deposition (Form II) particularly in the activated state as compared with the permeable membranes of Controls 5 and 6. Thus, it is safely concluded that the permeable membranes of this invention possess a prominent ability to resist thrombosis.

EXAMPLE 16

A sample was obtained by following the procedure of Example 1, except that a mixture comprising $CaCl_2$/methanol/water/dimethyl sulfoxide in a weight ratio of 3/4/2/2 was used. Viscosity of the solution was 18 poises (at 30° C.). By observation under a SEM, the surface of the produced membrane was found to possess a globulitic structure. The permeability of the produced membrane to water was 329 ml/m².hr.mmHg.

EXAMPLE 17

100 Grams of polyether amide obtained in Example 1 was dissolved in phosphoric acid (85% by weight of aqueous solution) under heating to obtain a solution having 20% by weight of concentration. The solution was degased by centrifusion. Viscosity of the solution was 370 poises (at 30° C.). The resultant solution was flowed on a substrate in a fixed thickness in gas phase and was coagulated by dipping into a coagulant comprising $CaCl_2$/methanol/water mixture controlled at a temperature of 5° C. for 10 minutes and removing remained phosphoric acid and coagulant on the coagulated membrane by flowing water to obtain a sample. By observation under a SEM, the surface of the produced membrane was found to possess a glubulitic structure. The permeability of the produced membrane to water was 37 ml/m$^2$.hr.mmHg.

EXAMPLE 18

A sample was obtained by following the procedure of Example 12, except that a mixture comprising $CaCl_2$/methanol/water in a weight ratio of 2/3/7 was used. Viscosity of the solution was 370 poises (at 30° C.). By observation under a SEM, the surface of the produced membrane was found to possess a globulitic structure. The permeability of the produced membrane to water was 9 ml/m$^2$.hr.mmHg.

EXAMPLE 19

90 Grams of a block copolymer modified with stearylamine both terminals thereof wherein a polyether moiety comprises polypropylene oxide and a polyamide moiety comprises nylon 12 and dimer acid was dissolved in formic acid (99 w/v %) under heating to obtain a solution having 18% by weight of concentration. Viscosity of the solution was 37 poises (at 30° C.). The solution was degased by standing at a temperature of 30° C. for 2 hours. The resultant solution was flowed on a substrate in a fixed thickness in gas phase and was coagulating by dipping into a coagulant comprising methanol/water mixture(weight ratio: 7/3) controlled at a temperature of 25° C. for 5 minutes and removing remained formic acid and coagulant on the coagulated membrane by flowing water to obtain a sample. By observation under a SEM, the surface of the produced membrane was found to possess a globulitic structure. The permeability of the produced membrane to water was 44 ml/m$^2$.hr.mmHg. Further, the membrane thus obtained was subjected to autoclave sterilization at a temperature of 121° C. for 20 minutes and to exudation test to obtain $\Delta pH$ of 0.32 and UV absorption of 0.005. Also the membrane thus obtained was subjected to γ-ray sterilization (2 Mrad) and to exudation test to obtain $\Delta pH$ of 0.01 and UV absorption of 0.055.

EXAMPLE 20

1200 Grams of polyether amide obtained in Example 1 was dissolved in 3800 g of formic acid (99 w/v %) under heating to obtain a solution having 24% by weight of concentration. Viscosity of the solution was 27 poises (at 30° C.). After removing foreign matters by using a filter, digasification was carried out by standing(30° C.) in vacuo. The solution was subjected to spinning through a nozzle for manufacturing hollow fibers using $CaCl_2$/methanol/water mixture in a weight ratio of 2/3/21 as inner liquid and extruding into a coagulant comprising the same liquid to coagulate the solution and then wound to obtain hollow fibers. The hollow fibers thus obtained was immediately washed with flowing water, dipped to 40% by weight of aqueous glycerol solution at 60° C. for 5 minutes for maintaining inner diameter, washed out the inner liquid of the hollow fibers and dried at 80° C. in an oven for 5 minutes.

Both ends of the hollow fibers were fixed polyurethane resin and cut the both ends to obtain a minimodule. The water permeability of the minimodule was 19 ml/m$^2$.hr.mmHg.

Further, sieve coefficient (SC) of alubnin using bovin blood was SC=0.

In the above Examples, the exudation test was carried out as follows:

The membrane was cut in an appropriate size, dipped into a vessel filled with deionized water in an amount of 1000 times to the weight of the membrane, and in case of autoclave sterilization method liquid was removed at the same temperature and time to obtain analyte liquid, and in case of γ ray sterilization method, liquid was removed after heating at 70°±5° C. for one hour and cooling to obtain analyte liquid.

(1) $\Delta pH$

Each 20 ml of analyte liquid and control liquid were collected, 1.0 g of potassium chloride was added to water to become 1000 ml, and the 1.0 ml of aqueous potassium chloride solution was added respectively. pH of both liquids was measured and the difference of both pHs was calculated.

(2) UV absorption

Maximum value of absorption at 220 to 350 nm of wavelength was measured comparing with control liquid.

Evaluation of the minimodule was carried out as follows:

(1) Measurement of permeability to water

As shown in FIG. 11, a minimodule was connected with tubes 17 and 18 equipped with a rotary pump 14 and pressure gages 15a, 15b were equipped at both ends of the minimodule. A vessel 12 filled with physiological saline 13 controlled a temperature of to 37°±1° C. was dipped in a thermostat tank 11, one end of the tube 17 was introduced into the physiological saline 13, while on end of the tube 18 was connected with the vessel 12 to form a circuit. The physiological saline was flowed through the circuit at 10 ml/min of flow amount of inlet side and pressure difference between membranes, and after steady state was obtained, the permeated physiological saline was collected in a vessel 19 and calculated in respect of membrane area under relation to the amount of physiological saline and time.

(2) Measurement of seine coefficient (SC) of albumin

Outlet side of the circuit of permeability to water measurement was changed to a single pass and substituted with bovine blood (at 37°±1° C.) controlled 30% of hematocryt value and 6.0 g/dl of total protein. After steady state was obtained at 10 ml/min of amount of inlet side and 100 mmgH of pressure difference between membranes, liquids of both inlet and outlet sides of the minimodule and filtrate side were collected and obtain concentrations of each concentration to calculate by the following equation.

$$SC = C_F / \{(C_{Fi} + C_{Fo})/2\}$$

wherein $C_F$: Concentration of fitrate $C_{Fi}$: Concentration of liquid at inlet side of minimodule $C_{Fo}$: Concentration of liquid at outlet side of minimodule

EXAMPLE 21

A block copolymer modified with stearylamine both terminals thereof wherein a polyether moiety comprises polypropylene oxide and polyamide moiety comprises nylon 12 and dimer acid was heated and kneaded by an extruder equipped with a nozzle for manufacturing hollow fibers and extruded through the nozzle an introduced into water and cooled to obtain hollow fibers (inner diameter 310 μm and wall thickness 24 μm). The hollow fibers thus obtained was dipped into dimethyl formamide maintained at 100° C. for 60 minutes and then dipped into water bath maintained at 100° C. for 60 minutes and then dipped into water bath maintained at 20° C. to obtain hollow fibers. The membrane thus obtained had 7.0 ml/m$^2$.hr.mmHg of water permeability.

EXAMPLE 22

400 Grams of a block copolymer modified with stiarylamine both terminals thereof wherein a polyether moiety comprises polypropylene oxide and polyamide moiety comprises nylon 12 and dimer acid and 600 g of 1.3-dimethyl-2-imidazoline were dissolved under heating and the melted mixture was subjected to spinning through a nozzle for manufacturing hollow fibers and extruded and cooled to obtain hollow fibers (inner diameter 220 μm and wall thickness 20 μm). The hollow fibers thus obtained was dipped into dimethyl formamide maintained at 100° C. for 60 minutes and then dipped into water bath maintained at 20° C. to obtain hollow fibers. The membrane thus obtained had 15.0 ml/m$^2$.hr.mmHg of water permeability.

What is claimed is:

1. A permeable membrane excellent in biocompatibility, produced by forming coagulation by melting method in the form of a membrane a terminal-modified polyamide, i.e. a polyether amide comprising component units represented by the following structural formula (I), (II), (III), or (IV), possessing hydrocarbon groups of one to 22 carbon atoms at the terminals thereof, and having a molecular weight in the range of from 10,000 to 100,000, said terminal-modified polyamide being such that the number of said hydrocarbon groups is in the range of from 5 to 100% based on the number of all of the terminal groups of said polyether amide, placing said membrane in contact with a medium capable of swelling or partially dissolving said membrane, and further placing the resultant altered membrane in contact with a solution consisting mainly of a nonsolvent for said polyether amide.

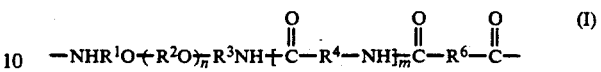

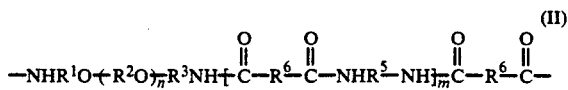

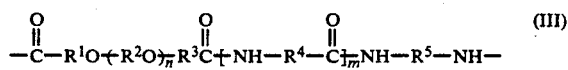

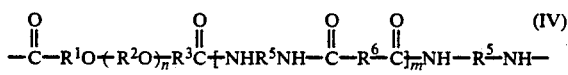

wherein $R^1$, $R^2$, and $R^3$ are independently a linear or branched alkylene group of two to four carbon atoms, $R^4$, $R^5$, and $R^6$ are independently an aliphatic, alicyclic, or aromatic hydrocarbon group of two to 36 carbon atoms, n is a numeral in the range of from 0 to 180, and m is a numeral in the range of from 1 to 400.

2. A membrane according to claim 1, wherein said medium capable of swelling or dissolving said polyether amide comprises mainly a poor solvent for said polyether amide.

3. A membrane according to claim 1, wherein said solution comprising mainly a nonsolvent for said polyether amide containing mainly water.

4. A membrane according to claim 1, wherein said medium capable of dissolving said polyether amide is a mixture comprising dimethyl sulfoxide and dimethyl formamide at a weight ratio in the range of 30–0:70–100 or a mixture consisting of dimethyl sulfoxide and N-methyl pyrrolidone at a weight ratio in the range of 30–0:70–100.

5. A membrane according to claim 1, which possesses a prominent ability to resist thrombosis. h

* * * * *

UNITED STATES PATENT AND TRADEMARK OFFICE
CERTIFICATE OF CORRECTION

PATENT NO. : 5,279,738
DATED : January 18, 1994
INVENTOR(S) : Yukio SEITA et al

It is certified that error appears in the above-identified patent and that said Letters Patent is hereby corrected as shown below:

In Column 10, line 59, delete "indicate" and insert -- indicated --.

In Column 12, between lines 56 and 57, insert -- EXAMPLE 5 --.

In Column 22, line 44, delete "thrombosis.h" and insert -- thrombosis. --.

Signed and Sealed this

Sixteenth Day of August, 1994

Attest:

BRUCE LEHMAN

*Attesting Officer*    *Commissioner of Patents and Trademarks*